(12) United States Patent
Sumasu

(10) Patent No.: US 10,348,235 B2
(45) Date of Patent: Jul. 9, 2019

(54) MOTOR CONTROL UNIT

(71) Applicant: JTEKT CORPORATION, Osaka-shi, Osaka (JP)

(72) Inventor: Hiroshi Sumasu, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/100,808

(22) Filed: Aug. 10, 2018

(65) Prior Publication Data

US 2019/0068105 A1    Feb. 28, 2019

(30) Foreign Application Priority Data

Aug. 29, 2017   (JP) ................. 2017-164505

(51) Int. Cl.
| | | |
|---|---|---|
| H02P 27/08 | (2006.01) | |
| H02P 21/22 | (2016.01) | |
| B62D 5/04 | (2006.01) | |
| H02M 1/44 | (2007.01) | |
| H02P 21/00 | (2016.01) | |
| B62D 6/10 | (2006.01) | |

(52) U.S. Cl.
CPC .............. *H02P 27/08* (2013.01); *B62D 5/04* (2013.01); *H02M 1/44* (2013.01); *H02P 21/00* (2013.01); *H02P 21/22* (2016.02); *B62D 5/0409* (2013.01); *B62D 5/0463* (2013.01); *B62D 6/10* (2013.01)

(58) Field of Classification Search
CPC .......... H02P 27/08; H02P 21/22; H02P 21/00; B62D 5/04; H02M 1/44
USPC .................................................. 318/400.17
See application file for complete search history.

(56) References Cited

U.S. PATENT DOCUMENTS

| | | | | |
|---|---|---|---|---|
| 6,512,341 B2 * | 1/2003 | Matsushiro | ............. | H02P 6/085 318/400.01 |
| 2006/0034364 A1 * | 2/2006 | Breitzmann | ...... | H02M 7/53871 375/238 |
| 2008/0079407 A1 * | 4/2008 | Shimada | .................. | H03K 7/08 323/283 |
| 2016/0190970 A1 * | 6/2016 | Yamazaki | ............... | H02P 27/08 318/400.29 |
| 2017/0093312 A1 * | 3/2017 | Hano | ..................... | H02P 6/085 |
| 2018/0083564 A1 * | 3/2018 | Sumasu | .................. | H02P 27/08 |

FOREIGN PATENT DOCUMENTS

| | | |
|---|---|---|
| EP | 1 630 940 A2 | 3/2006 |
| EP | 3 297 155 A1 | 3/2018 |
| JP | S64-50766 A | 2/1989 |

OTHER PUBLICATIONS

Jan. 7, 2019 Extended European Search Report issued in European Patent Application No. 18190158.8.

* cited by examiner

*Primary Examiner* — Kawing Chan
(74) *Attorney, Agent, or Firm* — Oliff PLC

(57) ABSTRACT

A motor control unit includes a PWM count changer that when, out of all possible combinations of any two of three phases, at least one of the combinations has a difference in PWM count less than a threshold value, changes a PWM count of at least one of the two phases of the at least one of the combinations for each of PWM periods within a current control period, without changing the total of the PWM counts of the at least one of the two phases within the current control period, such that each of the combinations has a difference in PWM count greater than or equal to the threshold value.

3 Claims, 13 Drawing Sheets

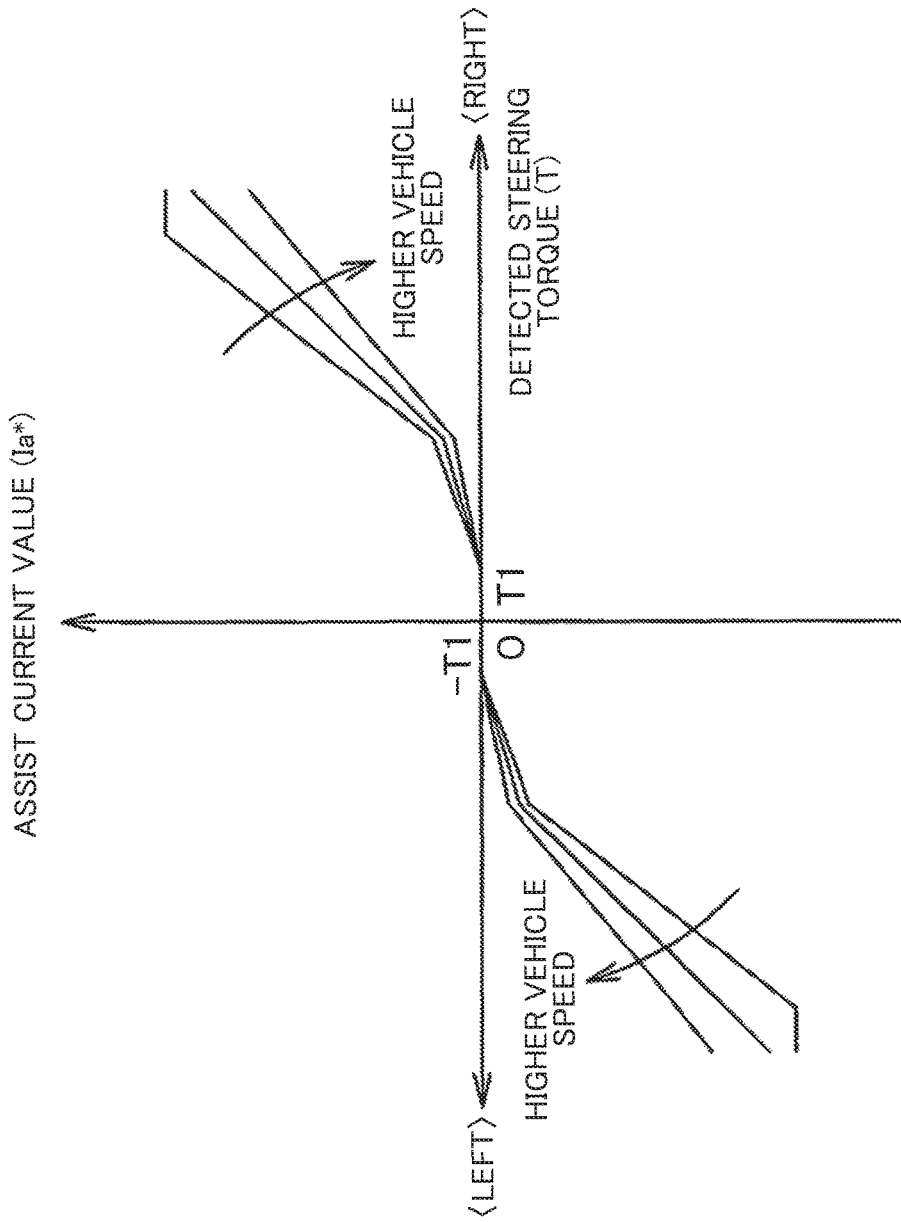

FIG. 6A

| PERIOD NUMBER i | 1 | 2 | 3 | 4 | 5 | 6 | 7 | 8 | 9 | 10 |
|---|---|---|---|---|---|---|---|---|---|---|
| VARIATION | +x | −x | +x | −x | +x | −x | +x | −x | +x | −x |

FIG. 6B

| PERIOD NUMBER i | 1 | 2 | 3 | 4 | 5 | 6 | 7 | 8 | 9 | 10 |
|---|---|---|---|---|---|---|---|---|---|---|
| VARIATION | −x | +x | −x | +x | −x | +x | −x | +x | −x | +x |

FIG. 6C

| PERIOD NUMBER i | 1 | 2 | 3 | 4 | 5 | 6 | 7 | 8 |
|---|---|---|---|---|---|---|---|---|
| VARIATION | +x | 0 | −x | 0 | +x | 0 | −x | 0 |

FIG. 6D

| PERIOD NUMBER i | 1 | 2 | 3 | 4 | 5 | 6 | 7 | 8 |
|---|---|---|---|---|---|---|---|---|
| VARIATION | 0 | +x | 0 | −x | 0 | +x | 0 | −x |

FIG. 8A

| PERIOD NUMBER i | 1 | 2 | 3 | 4 | 5 | 6 | 7 | 8 | 9 | 10 | TOTAL |
|---|---|---|---|---|---|---|---|---|---|---|---|
| U-PHASE PWM COUNT | 530 | 530 | 530 | 530 | 530 | 530 | 530 | 530 | 530 | 530 | 5300 |
| V-PHASE PWM COUNT | 490 | 490 | 490 | 490 | 490 | 490 | 490 | 490 | 490 | 490 | 4900 |
| W-PHASE PWM COUNT | 400 | 400 | 400 | 400 | 400 | 400 | 400 | 400 | 400 | 400 | 4000 |

FIG. 8B

| PERIOD NUMBER i | 1 | 2 | 3 | 4 | 5 | 6 | 7 | 8 | 9 | 10 | TOTAL |
|---|---|---|---|---|---|---|---|---|---|---|---|
| VARIATION PATTERN (FOR V-PHASE) | x | -x | x | -x | x | -x | x | -x | x | -x | 0 |

FIG. 8C

| PERIOD NUMBER i | 1 | 2 | 3 | 4 | 5 | 6 | 7 | 8 | 9 | 10 | TOTAL |
|---|---|---|---|---|---|---|---|---|---|---|---|
| V-PHASE PWM COUNT | 490 | 490 | 490 | 490 | 490 | 490 | 490 | 490 | 490 | 490 | 4900 |
| VARIATION PATTERN (FOR V-PHASE) | 190 | -190 | 190 | -190 | 190 | -190 | 190 | -190 | 190 | -190 | 0 |
| CHANGED V-PHASE PWM COUNT | 680 | 300 | 680 | 300 | 680 | 300 | 680 | 300 | 680 | 300 | 4900 |
| U-PHASE PWM COUNT | 530 | 530 | 530 | 530 | 530 | 530 | 530 | 530 | 530 | 530 | 5300 |
| W-PHASE PWM COUNT | 400 | 400 | 400 | 400 | 400 | 400 | 400 | 400 | 400 | 400 | 4000 |
| $\Delta Cuv$ | 150 | 230 | 150 | 230 | 150 | 230 | 150 | 230 | 150 | 230 | |
| $\Delta Cvw$ | 280 | 100 | 280 | 100 | 280 | 100 | 280 | 100 | 280 | 100 | |

FIG. 10A

| PERIOD NUMBER i | 1 | 2 | 3 | 4 | 5 | 6 | 7 | 8 | 9 | 10 | TOTAL |
|---|---|---|---|---|---|---|---|---|---|---|---|
| U-PHASE PWM COUNT | 530 | 530 | 530 | 530 | 530 | 530 | 530 | 530 | 530 | 530 | 5300 |
| V-PHASE PWM COUNT | 490 | 490 | 490 | 490 | 490 | 490 | 490 | 490 | 490 | 490 | 4900 |
| W-PHASE PWM COUNT | 360 | 360 | 360 | 360 | 360 | 360 | 360 | 360 | 360 | 360 | 3600 |

FIG. 10B

| PERIOD NUMBER i | 1 | 2 | 3 | 4 | 5 | 6 | 7 | 8 | 9 | 10 | TOTAL |
|---|---|---|---|---|---|---|---|---|---|---|---|
| VARIATION PATTERN (FOR V-PHASE) | x | -x | x | -x | x | -x | x | -x | x | -x | 0 |

FIG. 10C

| PERIOD NUMBER i | 1 | 2 | 3 | 4 | 5 | 6 | 7 | 8 | 9 | 10 | TOTAL |
|---|---|---|---|---|---|---|---|---|---|---|---|
| V-PHASE PWM COUNT | 490 | 490 | 490 | 490 | 490 | 490 | 490 | 490 | 490 | 490 | 4900 |
| VARIATION PATTERN (FOR V-PHASE) | 230 | -230 | 230 | -230 | 230 | -230 | 230 | -230 | 230 | -230 | 0 |
| CHANGED V-PHASE PWM COUNT | 720 | 260 | 720 | 260 | 720 | 260 | 720 | 260 | 720 | 260 | 4900 |
| U-PHASE PWM COUNT | 530 | 530 | 530 | 530 | 530 | 530 | 530 | 530 | 530 | 530 | 5300 |
| W-PHASE PWM COUNT | 360 | 360 | 360 | 360 | 360 | 360 | 360 | 360 | 360 | 360 | 3600 |
| ΔCuv | 190 | 270 | 190 | 270 | 190 | 270 | 190 | 270 | 190 | 270 | |
| ΔCvw | 360 | 100 | 360 | 100 | 360 | 100 | 360 | 100 | 360 | 100 | |

FIG. 11A

| PERIOD NUMBER i | 1 | 2 | 3 | 4 | 5 | 6 | 7 | 8 | 9 | 10 | TOTAL |
|---|---|---|---|---|---|---|---|---|---|---|---|
| U-PHASE PWM COUNT | 910 | 910 | 910 | 910 | 910 | 910 | 910 | 910 | 910 | 910 | 9100 |
| V-PHASE PWM COUNT | 820 | 820 | 820 | 820 | 820 | 820 | 820 | 820 | 820 | 820 | 8200 |
| W-PHASE PWM COUNT | 100 | 100 | 100 | 100 | 100 | 100 | 100 | 100 | 100 | 100 | 1000 |

FIG. 11B

| PERIOD NUMBER i | 1 | 2 | 3 | 4 | 5 | 6 | 7 | 8 | 9 | 10 | TOTAL |
|---|---|---|---|---|---|---|---|---|---|---|---|
| VARIATION PATTERN (FOR U-PHASE) | x | -x | x | -x | x | -x | x | -x | x | -x | 0 |
| VARIATION PATTERN (FOR V-PHASE) | -x | x | -x | x | -x | x | -x | x | -x | x | 0 |

FIG. 11C

| PERIOD NUMBER i | 1 | 2 | 3 | 4 | 5 | 6 | 7 | 8 | 9 | 10 | TOTAL |
|---|---|---|---|---|---|---|---|---|---|---|---|
| U-PHASE PWM COUNT | 910 | 910 | 910 | 910 | 910 | 910 | 910 | 910 | 910 | 910 | 9100 |
| VARIATION PATTERN (FOR U-PHASE) | 90 | -90 | 90 | -90 | 90 | -90 | 90 | -90 | 90 | -90 | 0 |
| CHANGED U-PHASE PWM COUNT | 1000 | 820 | 1000 | 820 | 1000 | 820 | 1000 | 820 | 1000 | 820 | 9100 |
| V-PHASE PWM COUNT | 820 | 820 | 820 | 820 | 820 | 820 | 820 | 820 | 820 | 820 | 8200 |
| VARIATION PATTERN (FOR V-PHASE) | -100 | 100 | -100 | 100 | -100 | 100 | -100 | 100 | -100 | 100 | 0 |
| CHANGED V-PHASE PWM COUNT | 720 | 920 | 720 | 920 | 720 | 920 | 720 | 920 | 720 | 920 | 8200 |
| $\Delta C_{uv}$ | 280 | 100 | 280 | 100 | 280 | 100 | 280 | 100 | 280 | 100 | |

FIG. 13A

| PERIOD NUMBER i | 1 | 2 | 3 | 4 | 5 | 6 | 7 | 8 | 9 | 10 | TOTAL |
|---|---|---|---|---|---|---|---|---|---|---|---|
| U-PHASE PWM COUNT | 530 | 530 | 530 | 530 | 530 | 530 | 530 | 530 | 530 | 530 | 5300 |
| V-PHASE PWM COUNT | 490 | 490 | 490 | 490 | 490 | 490 | 490 | 490 | 490 | 490 | 4900 |
| W-PHASE PWM COUNT | 470 | 470 | 470 | 470 | 470 | 470 | 470 | 470 | 470 | 470 | 4700 |

FIG. 13B

| PERIOD NUMBER i | 1 | 2 | 3 | 4 | 5 | 6 | 7 | 8 | 9 | 10 | TOTAL |
|---|---|---|---|---|---|---|---|---|---|---|---|
| VARIATION PATTERN (FOR U-PHASE) | x | −x | x | −x | x | −x | x | −x | x | −x | 0 |
| VARIATION PATTERN (FOR V-PHASE) | x | −x | x | −x | x | −x | x | −x | x | −x | 0 |
| VARIATION PATTERN (FOR W-PHASE) | −x | x | −x | x | −x | x | −x | x | −x | x | 0 |

FIG. 13C

| PERIOD NUMBER i | 1 | 2 | 3 | 4 | 5 | 6 | 7 | 8 | 9 | 10 | TOTAL |
|---|---|---|---|---|---|---|---|---|---|---|---|
| U-PHASE PWM COUNT | 530 | 530 | 530 | 530 | 530 | 530 | 530 | 530 | 530 | 530 | 5300 |
| VARIATION PATTERN (FOR U-PHASE) | 80 | −80 | 80 | −80 | 80 | −80 | 80 | −80 | 80 | −80 | 0 |
| CHANGED U-PHASE PWM COUNT | 610 | 450 | 610 | 450 | 610 | 450 | 610 | 450 | 610 | 450 | 5300 |
| V-PHASE PWM COUNT | 490 | 490 | 490 | 490 | 490 | 490 | 490 | 490 | 490 | 490 | 4900 |
| VARIATION PATTERN (FOR V-PHASE) | 220 | −220 | 220 | −220 | 220 | −220 | 220 | −220 | 220 | −220 | 0 |
| CHANGED V-PHASE PWM COUNT | 710 | 270 | 710 | 270 | 710 | 270 | 710 | 270 | 710 | 270 | 4900 |
| W-PHASE PWM COUNT | 470 | 470 | 470 | 470 | 470 | 470 | 470 | 470 | 470 | 470 | 4700 |
| VARIATION PATTERN (FOR W-PHASE) | −80 | 80 | −80 | 80 | −80 | 80 | −80 | 80 | −80 | 80 | 0 |
| CHANGED W-PHASE PWM COUNT | 390 | 550 | 390 | 550 | 390 | 550 | 390 | 550 | 390 | 550 | 4700 |
| ΔCuv | 100 | 180 | 100 | 180 | 100 | 180 | 100 | 180 | 100 | 180 | |
| ΔCvw | 320 | 280 | 320 | 280 | 320 | 280 | 320 | 280 | 320 | 280 | |
| ΔCuw | 220 | 100 | 220 | 100 | 220 | 100 | 220 | 100 | 220 | 100 | |

MOTOR CONTROL UNIT

INCORPORATION BY REFERENCE

The disclosure of Japanese Patent Application No. 2017-164505 filed on Aug. 29, 2017 including the specification, drawings and abstract, is incorporated herein by reference in its entirety.

BACKGROUND OF THE INVENTION

1. Field of the Invention

The invention relates to a motor control unit for driving an electric motor by pulse width modulation (PWM).

2. Description of Related Art

In a motor control unit that performs vector control of a three-phase electric motor, a two-phase current command value is calculated for each current control period. A two-phase voltage command value is calculated on the basis of a deviation between the two-phase current command value and a detected two-phase current value. The two-phase voltage command value is subjected to two-phase to three-phase conversion that uses a rotation angle of the electric motor. Thus, U-phase, V-phase, and W-phase voltage command values (a three-phase voltage command value) are calculated. Then, U-phase, V-phase, and W-phase PWM signals with their respective duty cycles corresponding to the U-phase, V-phase, and W-phase voltage command values are generated and supplied to a three-phase inverter circuit.

Six switching elements that form the three-phase inverter circuit are controlled by the U-phase, V-phase, and W-phase PWM signals. This control applies a voltage corresponding to the three-phase voltage command value to the electric motor. Thus, a motor current flowing through the electric motor is controlled to follow the two-phase current command value.

Every time the switching elements of the three-phase inverter circuit are switched, a noise current flows through stray capacitances that exist in input and output lines and between the electric motor and ground. Such a noise current (a common-mode current) is greater when the switching elements of multiple phases are switched simultaneously than when the switching element of only one phase is switched (refer to Japanese Patent Application Publication No. H1-50766).

SUMMARY OF THE INVENTION

A purpose of the invention is to provide a motor control unit for reducing a common-mode noise that is caused by switching of switching elements when multiple PWM periods are included in a current control period.

An aspect of the invention provides a motor control unit for controlling a three-phase electric motor on the basis of PWM signals that are generated for each of multiple PWM periods included in a current control period. The motor control unit includes the following: a PWM count generator that generates PWM counts of three phases for each current control period; a PWM count setter that sets the PWM counts of the three phases generated for a specific current control period by the PWM count generator, as PWM counts of the respective phases for each of the PWM periods within the specific current control period; a PWM count changer that when, out of all possible combinations of any two of the three phases, at least one of the combinations has a difference in PWM count less than a threshold value, changes the PWM count of at least one of the two phases of the at least one of the combinations for each of the PWM periods within the specific current control period, without changing the total of the PWM counts of the at least one of the two phases within the specific current control period, such that each of the combinations has a difference in PWM count greater than or equal to the threshold value; and a PWM signal generator that generates the PWM signals for the respective phases for each of the PWM periods, on the basis of the PWM counts that are set for the respective phases for each of the PWM periods within the specific current control period and that are changed by the PWM count changer.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is a graph illustrating an example of setting an assist current value Ia* for a detected steering torque T;

FIGS. 6A to 6D are tables illustrating examples of variation patterns;

FIG. 8A is a diagram explaining a first PWM count change process and illustrating examples of U-phase, V-phase, and W-phase PWM counts for each PWM period Tc within the current control period Ta;

FIG. 8B is a diagram illustrating a variation pattern according to the first PWM count change process;

FIG. 8C is a diagram illustrating the PWM counts changed by the first PWM count change process;

FIG. 10A is a diagram explaining a second PWM count change process and illustrating examples of U-phase, V-phase, and W-phase PWM counts for each PWM period Tc within the current control period Ta;

FIG. 10B is a diagram illustrating a variation pattern according to the second PWM count change process;

FIG. 10C is a diagram illustrating the PWM counts changed by the second PWM count change process;

FIG. 11A is a diagram explaining a third PWM count change process and illustrating examples of U-phase, V-phase, and W-phase PWM counts for each PWM period Tc within the current control period Ta;

FIG. 11B is a diagram illustrating a variation pattern according to the third PWM count change process;

FIG. 11C is a diagram illustrating the PWM counts changed by the third PWM count change process;

FIG. 13A is a diagram explaining a fourth PWM count change process and illustrating examples of U-phase, V-phase, and W-phase PWM counts for each PWM period Tc within the current control period Ta;

FIG. 13B is a diagram illustrating a variation pattern according to the fourth PWM count change process; and FIG. 13C is a diagram illustrating the PWM counts changed by the fourth PWM count change process.

DETAILED DESCRIPTION OF EMBODIMENTS

Figure 1:
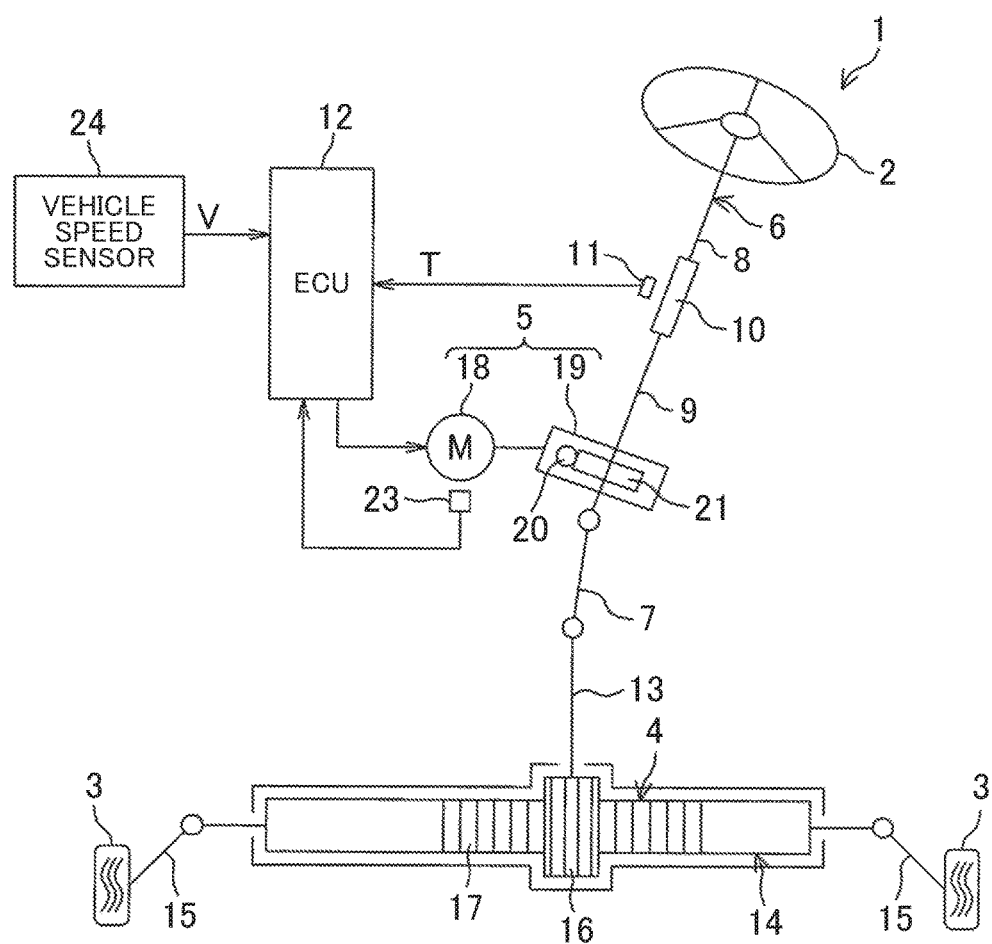
FIG. 1 is a diagram schematically illustrating an electric power steering system that uses a motor control unit according to an embodiment of the invention.

An embodiment of the invention is described below with reference to the drawings. FIG. 1 is a diagram schematically illustrating an electric power steering (EPS) system 1 that uses a motor control unit according to the embodiment of the invention. The electric power steering system 1 includes a steering wheel 2, a steering operation mechanism 4, and a steering assist mechanism 5. The steering wheel 2 is a steering member used to steer a vehicle. The steering operation mechanism 4 steers steered wheels 3 in synchronization with rotation of the steering wheel 2. The steering assist mechanism 5 assists a driver in steering the vehicle. The steering wheel 2 and the steering operation mechanism 4 are mechanically coupled together through a steering shaft 6 and an intermediate shaft 7.

The steering shaft 6 includes an input shaft 8 and an output shaft 9. The input shaft 8 is coupled to the steering wheel 2. The output shaft 9 is coupled to the intermediate shaft 7. The input shaft 8 and the output shaft 9 are coupled together through a torsion bar 10 and are rotatable relative to each other. A torque sensor 11 is located near the torsion bar 10. On the basis of the relative rotational displacement between the input shaft 8 and the output shaft 9, the torque sensor 11 detects a steering torque T being applied to the steering wheel 2. According to the embodiment, for example, the steering torque T detected by the torque sensor 11 has a positive value when applied to steer the vehicle to the right, and has a negative value when applied to steer the vehicle to the left. The steering torque T with a greater absolute value indicates the steering torque T with a greater magnitude.

The steering operation mechanism 4 is a rack and pinion mechanism, and includes a pinion shaft 13 and a rack shaft 14 as a steered shaft. Each of the steered wheels 3 is coupled to a different end of the rack shaft 14 through a tie rod 15 and a knuckle arm (not illustrated). The pinion shaft 13 is coupled to the intermediate shaft 7. The pinion shaft 13 rotates with the rotation of the steering wheel 2. A pinion 16 is coupled to one end (the bottom end in FIG. 1) of the pinion shaft 13.

The rack shaft 14 extends linearly in a lateral direction of the vehicle. A rack 17 is formed in a middle portion of the rack shaft 14 in an axial direction of the rack shaft 14 and meshes with the pinion 16. The pinion 16 and the rack 17 work in conjunction to convert rotary motion of the pinion shaft 13 to an axial movement of the rack shaft 14. The axial movement of the rack shaft 14 steers the steered wheels 3.

When the steering wheel 2 is turned (rotated), the rotation of the steering wheel 2 is transmitted to the pinion shaft 13 through the steering shaft 6 and the intermediate shaft 7. Then, the rotation of the pinion shaft 13 is converted to the axial movement of the rack shaft 14 by the pinion 16 and the rack 17. Thus, the steered wheels 3 are steered. The steering assist mechanism 5 includes an electric motor 18 and a speed-reduction mechanism 19. The electric motor 18 is used to assist a driver in steering the vehicle. The speed-reduction mechanism 19 transmits output torque of the electric motor 18 to the steering operation mechanism 4. The electric motor 18 is provided with a rotation angle sensor 23, such as a resolver, for detecting a rotation angle of a rotor of the electric motor 18. The speed-reduction mechanism 19 is a worm gear mechanism, and includes a worm shaft 20 and a worm wheel 21. The worm wheel 21 meshes with the worm shaft 20.

The worm shaft 20 is drivingly rotated by the electric motor 18. The worm wheel 21 is coupled to the steering shaft 6 and is rotatable along with the steering shaft 6. The worm wheel 21 is drivingly rotated by the worm shaft 20. When the worm shaft 20 is drivingly rotated by the electric motor 18, the worm wheel 21 is drivingly rotated, so that the steering shaft 6 is rotated. The rotation of the steering shaft 6 is transmitted to the pinion shaft 13 through the intermediate shaft 7. The rotation of the pinion shaft 13 is converted to the axial movement of the rack shaft 14. The axial movement of the rack shaft 14 steers the steered wheels 3. Thus, the electric motor 18 assists a driver in steering the vehicle by drivingly rotating the worm shaft 20.

The vehicle is equipped with a vehicle speed sensor 24 for detecting a vehicle speed V. The steering torque T, the vehicle speed V, an output signal from the rotation angle sensor 23, and other necessary signals are input to an electronic control unit (ECU) 12. The steering torque T is detected by the torque sensor 11. The vehicle speed V is detected by the vehicle speed sensor 24. On the basis of these input signals, the ECU 12 controls the electric motor 18.

Figure 2:
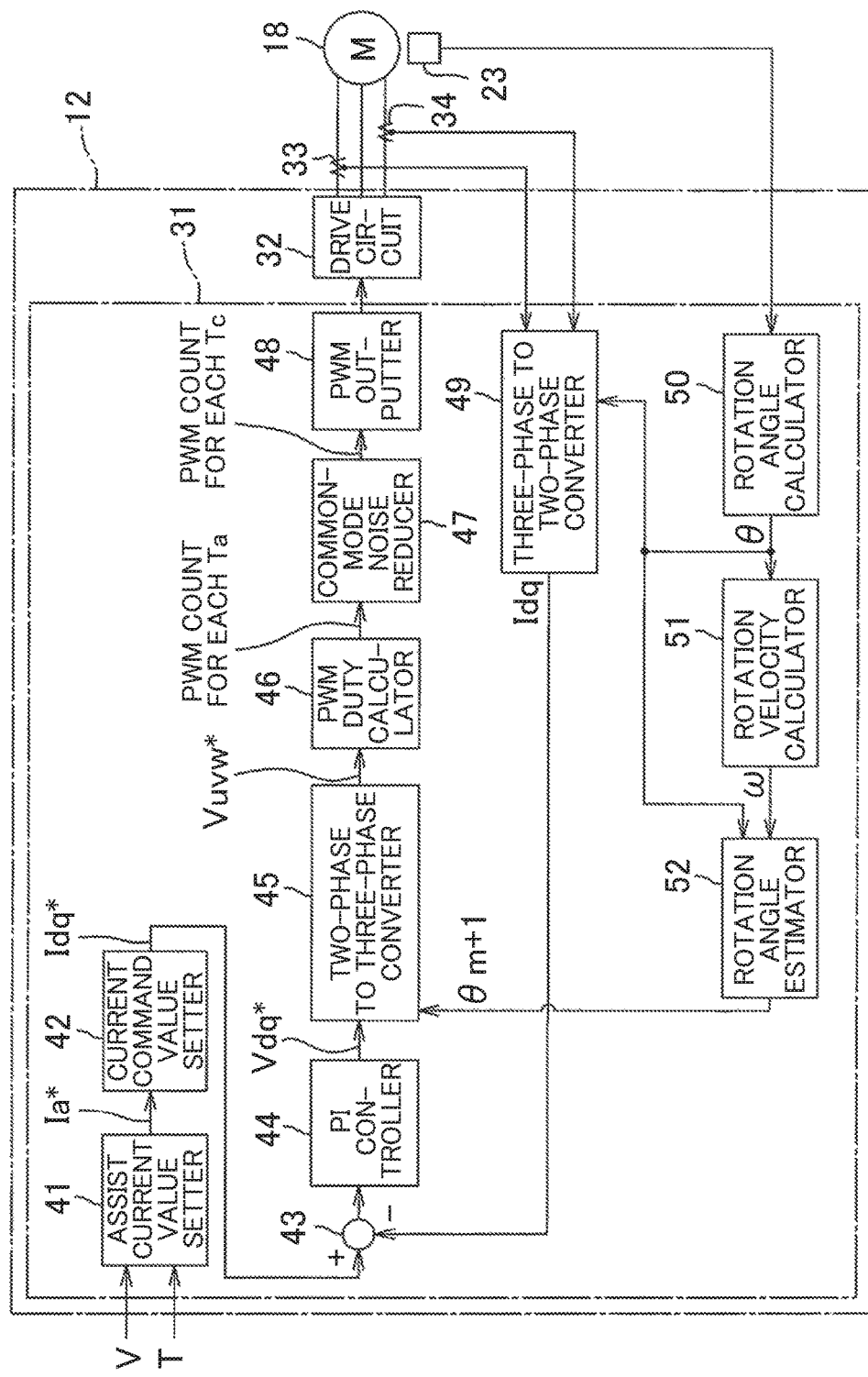
FIG. 2 is a block diagram illustrating the electrical structure of an electronic control unit (ECU)

FIG. 2 is a block diagram illustrating the electrical structure of the ECU 12. The ECU 12 includes a microcomputer 31 and a drive circuit 32. The drive circuit 32 is controlled by the microcomputer 31 and supplies electric power to the electric motor 18. The drive circuit 32 is a three-phase inverter circuit and has six switching elements (not illustrated). Three power supply lines that connect the drive circuit 32 and the electric motor 18 are provided with two current sensors 33 and 34. The current sensors 33 and 34 detect phase currents flowing through two of the three power supply lines.

Figure 3:
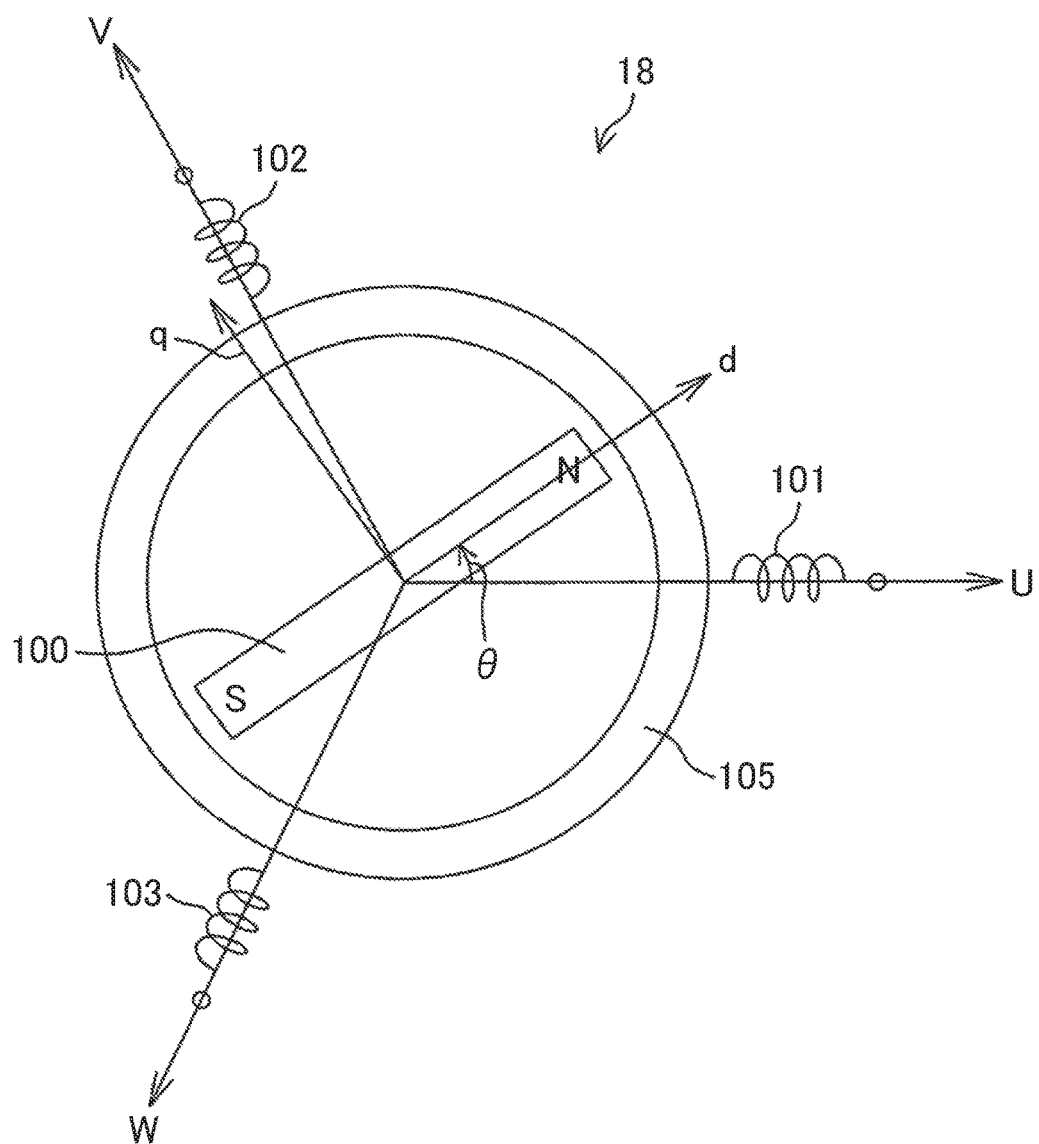
FIG. 3 is a diagram schematically illustrating the structure of an electric motor.

The electric motor 18 is, for example, a three-phase brushless motor. As schematically illustrated in FIG. 3, the electric motor 18 includes a rotor 100 and a stator 105. The rotor 100 serves as a field. The stator 105 includes a U-phase stator winding 101, a V-phase stator winding 102, and a W-phase stator winding 103. Three-phase stationary coordinates (a UVW coordinate system) are defined such that a U-axis, a V-axis, and a W-axis are respectively aligned in the directions of the U-phase stator winding 101, the V-phase stator winding 102, and the W-phase stator winding 103. Further, a two-phase rotational coordinate system (a dq coordinate system, i.e., an actual rotating coordinate system) is defined such that a d-axis (a magnetic pole axis) is aligned in the direction of a magnetic pole of the rotor 100 and such that a q-axis (a torque axis) is aligned in a direction perpendicular to the d-axis in the plane of rotation of the rotor 100. In the dq coordinate system, torque of the rotor 100 depends on only a q-axis current. Therefore, to generate desired torque, the q-axis current is controlled with a d-axis current set to zero. A rotation angle (electrical angle) θ of the rotor 100 is a rotation angle of the d-axis with respect to the U-axis. The dq coordinate system is an actual rotating coordinate system that rotates in accordance with the rotor rotation angle θ. Using the rotor rotation angle θ allows coordinate transformation between the UVW coordinate system and the dq coordinate system.

Referring back to FIG. 2, the microcomputer 31 includes a central processing unit (CPU) and a memory device (read only memory (ROM), random-access memory (RAM), non-volatile memory, etc.). The microcomputer 31 serves as multiple functional processors by executing predetermined programs. The functional processors include an assist current value setter 41, a current command value setter 42, a current deviation calculator 43, a proportional-integral (PI) controller 44, a two-phase to three-phase converter 45, a PWM duty calculator 46, a common-mode noise reducer 47, a PWM outputter 48, a three-phase to two-phase converter 49, a rotation angle calculator 50, a rotation velocity calculator 51, and a rotation angle estimator 52.

Figure 4:
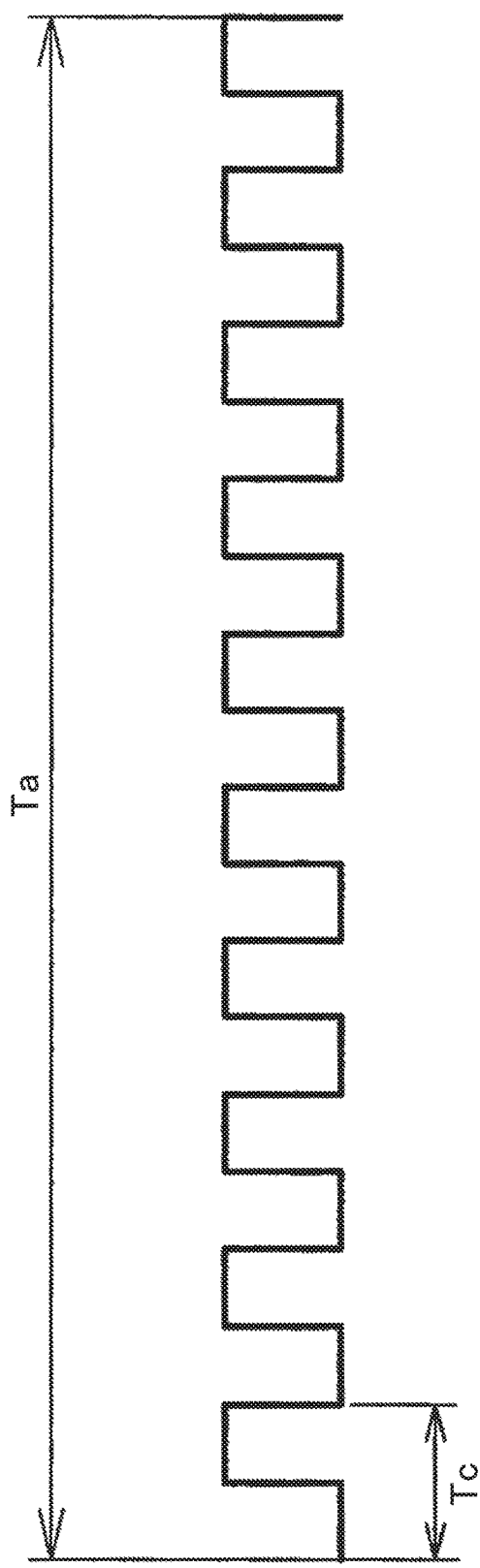
FIG. 4 is a diagram illustrating a relationship between a PWM period Tc and a current control period Ta.

As illustrated in FIG. 4, a period Tc of a PWM signal (hereinafter referred to as the "PWM period Tc") is less than a current control period Ta. According to the embodiment, the PWM period Tc is one-tenth of the current control period Ta. In other words, ten PWM periods Tc are included in one current control period Ta. The first period of the ten PWM periods Tc is hereinafter referred to Period 1. The other subsequent periods may be sequentially referred to as Periods 2, 3, ..., 9, 10. The period number of the PWM period Tc may be denoted by "i" (i=1, 2, ..., 9, 10). The frequency (=1/Tc) of a PWM signal is referred to as a carrier frequency.

A PWM clock corresponding to the PWM period Tc is hereinafter referred to as a PWM maximum count number Cmax. For example, when the PWM clock of a computer is 100 megahertz (MHz), and the frequency of a PWM signal (hereinafter referred to as the PWM frequency) is 100 kilohertz (kHz), the PWM maximum count number Cmax is given as follows: Cmax=100,000,000×(1/100,000)=1000.

Resolution of a voltage that is applied to the electric motor 18, i.e., the minimum change in the application voltage (hereinafter referred to as a voltage resolution Vr) is given as follows: Vr=Vb÷Cmax, where Cmax represents the PWM maximum count number and Vb represents a power supply voltage of the drive circuit 32. Thus, the voltage resolution Vr is given as follows: Vr=Vb/1000 voltage per least-significant-bit (V/LSB). As the value of the voltage resolution Vr becomes smaller, the minimum change in the application voltage becomes smaller, so that higher voltage resolution is obtained. In other words, as the value of the voltage resolution Vr becomes greater, the minimum change in the application voltage becomes greater, so that lower voltage resolution is obtained.

Referring back to FIG. 2, the rotation angle calculator 50 calculates, on the basis of the output signal from the rotation angle sensor 23, the rotor rotation angle θ (electrical angle) of the electric motor 18 for each current control period Ta. The rotor rotation angle θ calculated by the rotation angle calculator 50 is supplied to the three-phase to two-phase converter 49, the rotation velocity calculator 51, and the rotation angle estimator 52. According to the embodiment, the rotor rotation angle θ is obtained (detected) at the midpoint in time of the current control period Ta.

The rotation velocity calculator 51 calculates a rotation velocity (an angular velocity) ω of the rotor 100 of the electric motor 18 by time-differentiating the rotor rotation angle θ calculated by the rotation angle calculator 50. The rotation velocity ω calculated by the rotation velocity calculator 51 is supplied to the rotation angle estimator 52. From the following equation (1), the rotation angle estimator 52 estimates a next rotor rotation angle $θ_{(m+1)}$ that will be obtained at the midpoint in time of the next current control period Ta, on the basis of a last rotor rotation angle $θ_{(m-1)}$ that has been obtained at the midpoint in time of the last current control period Ta.

$$θ_{(m+1)}θ_{(m-1)}+ω·2Ta \quad (1)$$

The next rotor rotation angle $θ_{(m+1)}$ in the next current control period Ta, estimated by the rotation angle estimator 52, is supplied to the two-phase to three-phase converter 45. The assist current value setter 41 sets an assist current value Ia* for each current control period Ta, on the basis of the steering torque T detected by the torque sensor 11 and the vehicle speed V detected by the vehicle speed sensor 24. FIG. 5 illustrates an example of setting the assist current value Ia* for the detected steering torque T. In the example of FIG. 5, the detected steering torque T has a positive value when applied to steer the vehicle to the right, and has a negative value when applied to steer the vehicle to the left. The assist current value Ia* has a positive value when causing the electric motor 18 to generate a steering assist force for steering the vehicle to the right, and has a negative value when causing the electric motor 18 to generate a steering assist force for steering the vehicle to the left. The assist current value Ia* is positive when the detected steering torque T is positive, and is negative when the detected steering torque T is negative.

When the detected steering torque T falls within a very small value range (i.e., a torque dead zone) of −T1 to T1 (for example, T1=0.4 newton meter (N·m)), the assist current value Ia* is set to zero. In contrast, when the detected steering torque T falls outside the range of −T1 to T1, the assist current value Ia* is set such that the absolute value of the assist current value Ia* increases with an increase in the absolute value of the detected steering torque T. Further, the assist current value Ia* is set such that the absolute value of the assist current value Ia* decreases with an increase in the vehicle speed V detected by the vehicle speed sensor 24. Setting the assist current value Ia* in this way generates greater steering assist force when the vehicle travels at lower speeds, and generates less steering assist force when the vehicle travels at higher speeds.

On the basis of the assist current value Ia* set by the assist current value setter 41, the current command value setter 42 sets current command values indicative of current values that needs to be passed in the coordinate axes of the dq coordinate system. Specifically, the current command value setter 42 sets a d-axis current command value $I_d^*$ and a q-axis current command value $I_q^*$ (these command values $I_d^*$ and $I_q^*$ are hereinafter collectively referred to as a two-phase current command value $I_{dq}^*$). More specifically, the current command value setter 42 sets the q-axis current command value $I_q^*$ to the assist current value Ia* set by the assist current value setter 41 while setting the d-axis current command value $I_d^*$ to zero. The two-phase current command value $I_{dq}^*$ set by the current command value setter 42 is supplied to the current deviation calculator 43.

The three-phase to two-phase converter 49 first calculates, from two phase currents detected by the current sensors 33 and 34, a U-phase current $I_U$, a V-phase current $I_V$, and a W-phase current $I_W$ (these currents $I_U$, $I_V$, and $I_W$ are hereinafter collectively referred to as a three-phase detection current $I_{UVW}$). Then, the three-phase to two-phase converter 49 performs coordinate transformation from the three-phase detection current $I_{UVW}$ in the UVW coordinate system to a two-phase detection current $I_{dq}$ in the dq coordinate system. The two-phase detection current $I_{dq}$ includes a d-axis detection current $I_d$ and a q-axis detection current $I_q$. The coordinate transformation is performed by using the rotor rotation angle θ calculated by the rotation angle calculator 50.

The current deviation calculator 43 calculates a deviation of the d-axis detection current $I_d$ from the d-axis current command value $I_q^*$ and calculates a deviation of the q-axis detection current $I_q$ from the q-axis current command value $I_q^*$. These current deviations are supplied to the PI controller 44. The PI controller 44 performs PI-calculation on the current deviations calculated by the current deviation calculator 43. Thus, the PI controller 44 generates a two-phase voltage command value $V_{dq}^*$ (specifically, a d-axis voltage command value $V_d^*$ and a q-axis voltage command value $V_q^*$) indicative of a voltage value that needs to be applied to the electric motor 18. The two-phase voltage command value $V_{dq}^*$ is supplied to the two-phase to three-phase converter 45.

The two-phase to three-phase converter 45 performs two-phase to three-phase conversion on the two-phase voltage command value $V_{dq}^*$ calculated by the PI controller 44 in the present current control period Ta, by using the rotor rotation angle $\theta_{(m-1)}$ that is estimated by the rotation angle estimator 52 in the present current control period Ta as a rotor rotation angle in the next current control period Ta. Thus, the two-phase to three-phase converter 45 calculates a three-phase voltage command value $V_{UVW}^*$ for the next current control period Ta. The three-phase voltage command value $V_{UVW}^*$ includes a U-phase voltage command value $V_U^*$, a V-phase voltage command value $V_V^*$, and a W-phase voltage command value $V_W^*$. As such, the three-phase voltage command value $V_{UVW}^*$ for the next current control period Ta is obtained.

The three-phase voltage command value $V_{UVW}^*$ for the next current control period Ta, obtained by the two-phase to three-phase converter 45, is supplied to the PWM duty calculator 46. On the basis of the three-phase voltage command value $V_{UVW}^*$ for the next current control period Ta, the PWM duty calculator 46 generates U-phase, V-phase, and W-phase PWM counts (PWM duty cycles) for the next current control period Ta, and supplies the generated U-phase, V-phase, and W-phase PWM counts to the common-mode noise reducer 47.

For example, the U-phase PWM count is calculated as follows. The PWM duty calculator 46 calculates a U-phase PWM count Cu for a specific current control period Ta on the basis of the following equation (2), by using the maximum PWM count Cmax and the U-phase voltage command value $V_U^*$ for the specific current control period Ta that is obtained by the two-phase to three-phase converter 45.

$$Cu = V_U^* \times (Cmax/Vb) = V_U^* \times (1,000/Vb) \quad (2)$$

In the equation (2), Vb represents a power supply voltage of the drive circuit 32. Using the V-phase voltage command value $V_V^*$ instead of the U-phase voltage command value $V_U^*$ on the right hand side of the equation (2) calculates a V-phase PWM count Cv. Likewise, using the W-phase voltage command value Vw* instead of the U-phase voltage command value $V_U^*$ calculates a W-phase PWM count Cw.

The common mode noise reducer 47 reduces the likelihood of the switching elements of multiple phases, out of the six switching elements of the drive circuit 32, being switched simultaneously. As such, the common mode noise reducer 47 reduces a common-mode noise. Specifically, the common mode noise reducer 47 reduces the common-mode noise by performing processing (noise reduction processing) on the U-phase, V-phase, and W-phase PWM counts for the next current control period Ta, supplied from the PWM duty calculator 46. The operation of the common mode noise reducer 47 is described in detail later. After being subjected to the noise reduction processing through the common mode noise reducer 47, the U-phase, V-phase, and W-phase PWM counts are supplied to the PWM outputter 48 as U-phase, V-phase, and W-phase PWM counts for each of the PWM periods Tc within the next current control period Ta.

The PWM outputter 48 stores, over multiple current control periods, the U-phase, V-phase, and W-phase PWM counts for each of the PWM periods Tc within the current control period Ta, supplied from the common mode noise reducer 47. On the basis of the U-phase, V-phase PWM, and W-phase PWM counts for each of the PWM periods Tc within the present current control period Ta, supplied from the common mode noise reducer 47 in the last current control period Ta, the PWM outputter 48 generates U-phase, V-phase, and W-phase PWM signals for each of the PWM periods Tc within the present current control period Ta, and supplies the generated U-phase, V-phase, and W-phase PWM signals to the drive circuit 32. Specifically, for each of the PWM periods Tc within the present current control period Ta, the PWM outputter 48 generates U-phase, V-phase, and W-phase PWM signals having their respective duty cycles corresponding to the U-phase, V-phase, and W-phase PWM counts for each of the PWM periods Tc within the present current control period Ta, and supplies the U-phase, V-phase, and W-phase PWM signals to the drive circuit 32.

The six switching elements of the drive circuit 32 are controlled by the PWM signals supplied from the PWM outputter 48. Thus, voltages corresponding to the three-phase voltage command value $V_{UVW}^*$ for each of the PWM periods Tc are applied to the U-phase, V-phase, and W-phase stator windings 101, 102, and 103 of the electric motor 18. The current deviation calculator 43 and the PI controller 44 form a current feedback controller. Through the operation of the current feedback controller, the motor current flowing through the electric motor 18 is controlled to follow the two-phase current command value $I_{dq}^*$ set by the current command value setter 42.

A basic concept of how the common mode noise reducer 47 reduces a common-mode noise is described below. The common mode noise reducer 47 sets the U-phase, V-phase, and W-phase PWM counts Cu, Cv, and Cw for the next current control period Ta, supplied from the PWM duty calculator 46, respectively as U-phase, V-phase, and W-phase PWM counts Cu, Cv, and Cw for each of the PWM periods Tc within the next current control period Ta.

As already described, every time the switching elements of the drive circuit 32 are switched, a noise current flows through stray capacitances that exist in input and output lines and between the electric motor 18 and ground. In the PWM period Tc, such a noise current (a common-mode current) is greater when the switching elements of multiple phases are switched almost simultaneously than when the switching element of only one phase is switched.

In the PWM period Tc, if any two of the three phases has a difference in PWM count (hereinafter sometimes referred to as a PWM count difference) less than a predetermined threshold value α that is greater than zero (i.e., α>0), the switching elements of the two phases are switched almost simultaneously. Therefore, when, out of all possible combinations of any two of the three phases, at least one of the combinations has a difference in PWM count less than the threshold value α in the current control period Ta, the common mode noise reducer 47 changes the PWM count of at least one of the two phases of the at least one of the combinations for each of the PWM periods Tc within the current control period Ta such that each of the combination has a difference in PWM count greater than or equal to the threshold value α. In this case, the common mode noise reducer 47 keeps unchanged the total of the PWM counts of the at least one of the two phases within the current control period Ta.

Adding, to PWM counts of a certain phase, variations based on a variation pattern such as that illustrated in FIG. 6A makes it possible to change the PWM counts of the phase without changing the total of the PWM counts of the phase within the current control period Ta. In FIG. 6A, "x" represents a variation definition value that defines the absolute value of a variation for the PWM count of a certain phase in the PWM period Tc. A method of setting the variation definition value x is described later.

Figure 7:
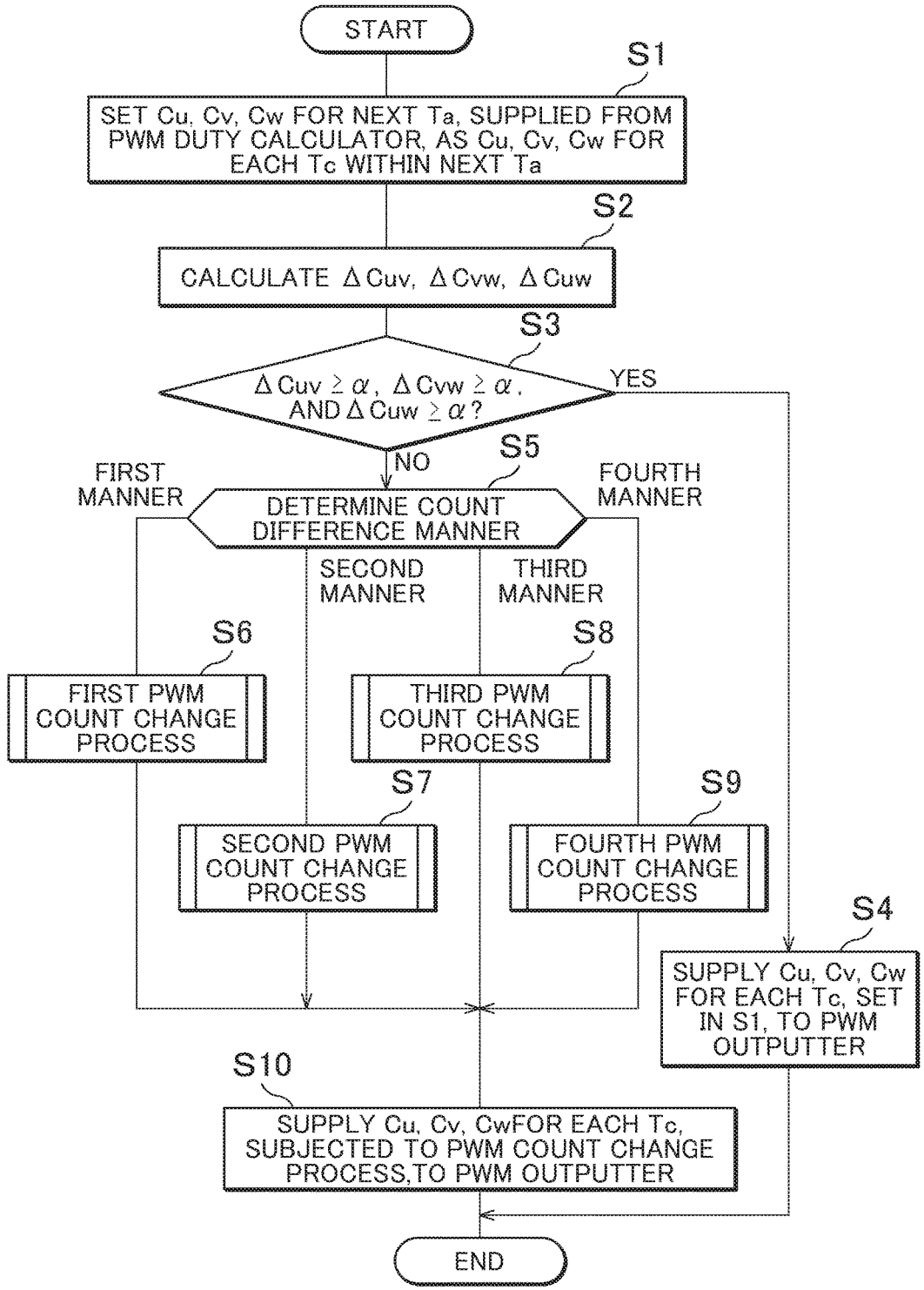
FIG. 7 is a flowchart explaining an example of the operation of a common-mode noise reducer.

The variation pattern is not limited to the pattern illustrated in FIG. 6A. For example, variation patterns illustrated in FIG. 6B, FIG. 6C, and FIG. 6D may be used instead. FIG. 6C and FIG. 6D are based on the assumption that eight PWM periods Tc are included in one current control period Ta. FIG. 7 is a flowchart illustrating an example of the operation of the common mode noise reducer 47.

The following description assumes that the variation pattern illustrated in FIG. 6A or FIG. 6B is used. First, the common mode noise reducer 47 sets U-phase, V-phase, and W-phase PWM counts Cu, Cv, and Cw for the next current control period Ta that are supplied from the PWM duty calculator 46, respectively as U-phase, V-phase, and W-phase PWM counts Cu, Cv, and Cw for each of PWM periods Tc within the next current control period Ta (step S1).

Next, the common mode noise reducer 47 calculates PWM count differences $\Delta Cuv$, $\Delta Cvw$, and $\Delta Cuw$ between each two of the three phases (step S2). The PWM count differences $\Delta Cuv$, $\Delta Cvw$, and $\Delta Cuw$ are respectively given by the following equations (3), (4), and (5).

$$\Delta Cuv = |Cu - Cv| \quad (3)$$

$$\Delta Cvw = |Cv - Cw| \quad (4)$$

$$\Delta Cuw = |Cu - Cw| \quad (5)$$

Then, the common mode noise reducer 47 determines whether or not all the PWM count differences $\Delta Cuv$, $\Delta Cvw$, and $\Delta Cuw$ are greater than or equal to a predetermined threshold value $\alpha$ ($\alpha > 0$) (step S3). The threshold value $\alpha$ is a PWM count difference required to switch the switching elements of any two phases at different times. According to the embodiment, the threshold value $\alpha$ is set to 100.

If all the PWM count differences $\Delta Cuv$, $\Delta Cvw$, and $\Delta Cuw$ are greater than or equal to the threshold value $\alpha$ (corresponding to YES in step S3), the common mode noise reducer 47 supplies, to the PWM outputter 48 without performing any additional processing, the U-phase, V-phase, and W-phase PWM counts Cu, Cv, and Cw that are set in step S1 for each of the PWM periods Tc within the next current control period Ta (step S4). After that, the common mode noise reducer 47 finishes processing in the present current control period Ta.

If at least one of the PWM count differences $\Delta Cuv$, $\Delta Cvw$, and $\Delta Cuw$ is less than the threshold value $\alpha$ (corresponding to NO in step S3), the common mode noise reducer 47 proceeds to step S5. In step S5, the common mode noise reducer 47 determines, on the basis of the PWM count differences $\Delta Cuv$, $\Delta Cvw$, and $\Delta Cuw$, which of the following four (first to fourth) manners a count difference manner corresponds to.

In the first manner, one of the PWM count differences $\Delta Cuv$, $\Delta Cvw$, and $\Delta Cuw$ is greater than or equal to the threshold value $\alpha$, and the other two of the PWM count differences $\Delta Cuv$, $\Delta Cvw$, and $\Delta Cuw$ are both less than the threshold value $\alpha$. In the second manner, one of the PWM count differences $\Delta Cuv$, $\Delta Cvw$, and $\Delta Cuw$ is less than the threshold value $\alpha$, the other two of the PWM count differences $\Delta Cuv$, $\Delta Cvw$, and $\Delta Cuw$ are both greater than or equal to the threshold value $\alpha$, and each of the PWM counts of the two phases that provide the one of the PWM count differences $\Delta Cuv$, $\Delta Cvw$, and $\Delta Cuw$ differs from a minimum count (0) or a maximum count (1000) by the threshold value $\alpha$ or more. In the third manner, one of the PWM count differences $\Delta Cuv$, $\Delta Cvw$, and $\Delta Cuw$ is less than the threshold value $\alpha$, the other two of the PWM count differences $\Delta Cuv$, $\Delta Cvw$, and $\Delta Cuw$ are both greater than or equal to the threshold value $\alpha$, and one of the PWM counts of the two phases that provide the one of the PWM count differences $\Delta Cuv$, $\Delta Cvw$, and $\Delta Cuw$ differs from the minimum count (0) or the maximum count (1000) by less than the threshold value $\alpha$. In the fourth manner, all the PWM count differences $\Delta Cuv$, $\Delta Cvw$, and $\Delta Cuw$ are less than the threshold value $\alpha$. If determining in step S5 that the count difference manner corresponds to the first manner, the common mode noise reducer 47 performs a first PWM count changing process (step S6).

The first PWM count changing process is described in detail below. FIG. 8A illustrates an example where the U-phase, V-phase, and W-phase PWM counts Cu, Cv, and Cw for each of the PWM periods Tc within the current control period Ta are respectively 530, 490, and 400. In this case, since $\Delta Cuv = 40$, $\Delta Cvw = 90$, and $\Delta Cuw = 130$, the count difference manner corresponds to the first manner.

In this case, since the PWM count difference $\Delta Cuw$ between the U-phase PWM count Cu and the W-phase PWM count Cw is greater than or equal to the threshold value $\alpha$, the common mode noise reducer 47 changes only the V-phase PWM count Cv. That is, when the count difference manner corresponds to the first manner, the common mode noise reducer 47 identifies, as a count change phase the PWM count of which needs to be changed, one phase other than two phases that have a PWM count difference greater than or equal to the threshold value $\alpha$.

Figure 9A:
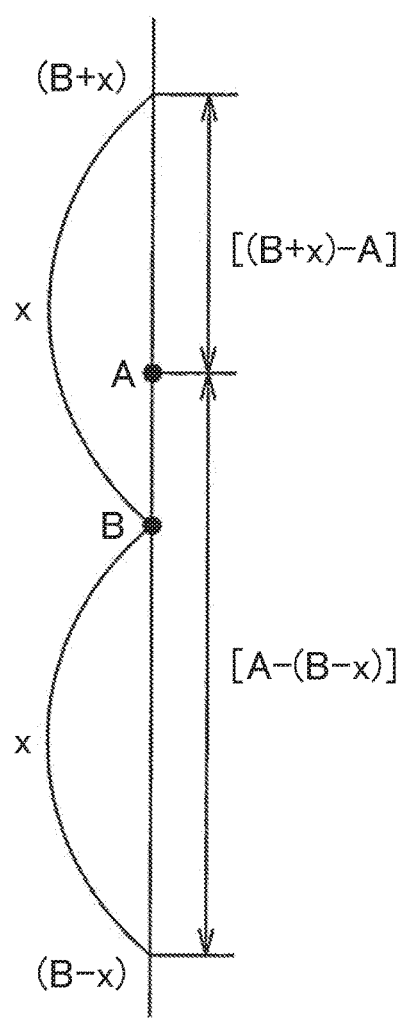
FIGS. 9A and 9B are diagrams explaining a method of setting a variation definition value x.

Then, the common mode noise reducer 47 sets a variation definition value x for the count change phase (the V-phase in this example). The method of setting the variation definition value x is described below. As illustrated in FIG. 9A, out of the PWM counts of two phases that have the PWM count difference less than the threshold value $\alpha$, the greater PWM count is defined herein as a PWM count A, and the smaller PWM count is defined herein as a PWM count B. Here, a case is considered where the PWM count B is changed on the basis of the variation pattern illustrated in FIG. 6A or FIG. 6B so that an absolute value |A−B| of the difference between the PWM count A and the changed PWM count B becomes greater than or equal to the threshold value $\alpha$. It is assumed that the variation definition value x is greater than or equal to the threshold value $\alpha$.

The value of the changed PWM count B is given by the expression (B−x) or (B+x), where x represents the variation definition value. Since the PWM count A is greater than the PWM count B (i.e., A>B), the value of the expression $\{(B+x)-A\}$ becomes less than the value of the expression $\{A-(B-x)\}$. Therefore, the variation definition value x needs to satisfy the following equation (6).

$$\{(B+x)-A\} = \alpha \quad (6)$$

Thus, the variation definition value x is given by the following equation (7).

$$x = \alpha + (A-B) \quad (7)$$

Figure 9B:
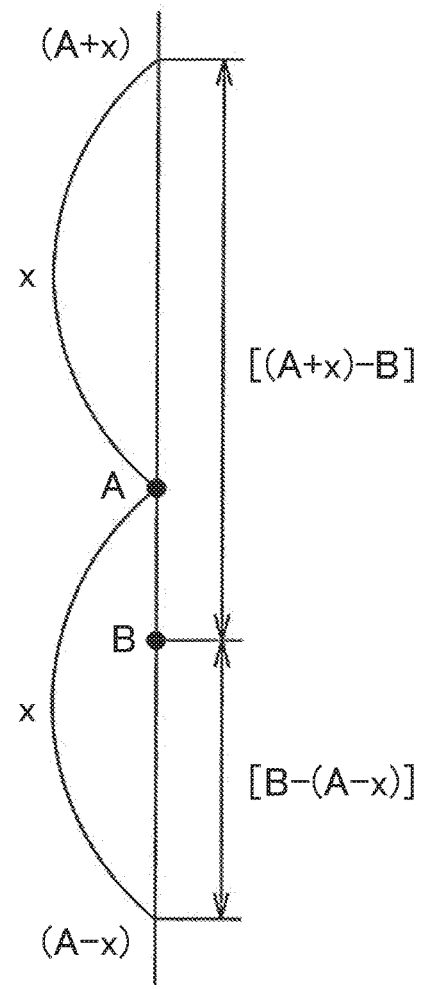

On the other hand, in a case where the PWM count A is changed so that the absolute value |A−B| of the difference between the PWM count B and the changed PWM count A becomes greater than or equal to the threshold value α, the value of the changed PWM count A is given by the expression (A+x) or (A−x), as illustrated in FIG. 9B. Since the PWM count A is greater than the PWM count B (i.e., A>B), the value of the expression {B−(A−x)} becomes less than the value of the expression {(A+x)−B}. Therefore, the variation definition value x needs to satisfy the following equation (8).

$${B-(A-x)}=\alpha \qquad (8)$$

Thus, the variation definition value x is given by the following equation (9).

$$x=\alpha+(A-B) \qquad (9)$$

In summary, when, out of the PWM counts of two phases that have the PWM count difference less than the threshold value α, the greater PWM count is defined as the PWM count A, and the smaller PWM count is defined as the PWM count B, the variation definition value x used to change the PWM count of any one of the two phases is given by the following equation (10).

$$x=\alpha(A-B) \qquad (10)$$

In this example, the variation definition value x used to change the PWM count of any one of the U-phase and the V-phase is given as follows: x=100+40=140. On the other hand, the variation definition value x used to change the PWM count of any one of the V-phase and the W-phase is given as follows: x=100+90=190. Obviously, using the smaller one of the two different variation definition values x does not allow the PWM count difference ΔCvw to become greater than or equal to threshold value α. For this reason, the common mode noise reducer 47 sets the greater one of the two different variation definition values x calculated on the basis of the equation (10). In other words, when PWM count differences between one phase and the other two phases are both less than the threshold value α, the common mode noise reducer 47 calculates the variation definition value x by using the greater one of the two PWM count differences as the value of the expression (A−B) in the equation (10).

Next, on the basis of the calculated variation definition value x and a predetermined variation pattern illustrated in FIG. 8B (identical to the variation pattern illustrated in FIG. 6A), the common mode noise reducer 47 changes the PWM count of the count change phase for each of the PWM periods Tc within the next current control period Ta. Specifically, the common mode noise reducer 47 adds, to the PWM count of the count change phase for each of the PWM periods Tc, a variation that is determined by the variation definition value x and the variation pattern. As such, the common mode noise reducer 47 changes the PWM count of the count change phase for each of the PWM periods Tc, and then finishes the first PWM count change process.

In this example, as illustrated in FIG. 8C, the variation (+190 or −190) determined by the variation definition value x and the variation pattern is added to the V-phase PWM count Cv for each of the PWM periods Tc. As a result, the V-phase PWM count Cv for each of the PWM periods Tc is changed. However, the total of the V-phase PWM counts Cv remains unchanged before and after the V-phase PWM counts Cv are changed. The V-phase PWM count Cv for each of the PWM periods Tc is changed in this way. Thus, as illustrated in FIG. 8C, both the PWM count differences ΔCuv and ΔCvw between the changed V-phase PWM count and the PWM counts of the other phases become greater than or equal to the threshold value α.

After finishing the first PWM count change process, the common mode noise reducer 47 proceeds to step S10. If determining in step S5 that the count difference manner corresponds to the second manner, the common mode noise reducer 47 performs a second PWM count changing process (step S7). The second PWM count changing process is described in detail below.

FIG. 10A illustrates an example where the U-phase, V-phase, and W-phase PWM counts Cu, Cv, and Cw for each of the PWM periods Tc within the current control period Ta are respectively 530, 490, and 360. In this case, since ΔCuv=40, ΔCvw=130, and ΔCuw=170, the count difference manner corresponds to the second manner. Out of two phases that have the PWM count difference less than the threshold value α, one phase with the greater PWM count is hereinafter sometimes referred to as an A phase, and the other phase with the smaller PWM count is hereinafter sometimes referred to as a B phase. Further, the remaining one of the three phases is hereinafter sometimes referred to as a C phase.

In this case, the PWM count difference ΔCuv between the U-phase (the A-phase) PWM count Cu and the V-phase (the B-phase) PWM count Cv is less than the threshold value α. To increase the PWM count difference ΔCuv, the V-phase PWM count Cv is changed with the U-phase PWM count Cu kept unchanged. That is, when the count difference manner corresponds to the second manner, the common mode noise reducer 47 identifies, as the count change phase, one of the two phases that have a PWM count difference less than the threshold value α.

The common mode noise reducer 47 calculates a variation definition value x for the count change phase (the V-phase in this example) on the basis of the equation (10). Then, the common mode noise reducer 47 determines whether a PWM count difference between a changed V-phase PWM count and the C-phase (the W-phase in this example) PWM count becomes greater than or equal to the threshold value α. If determining that the PWM count difference becomes greater than or equal to the threshold value α, the common mode noise reducer 47 sets the variation definition value x calculated on the basis of the equation (10). In contrast, if determining that the PWM count difference becomes less than the threshold value α, the common mode noise reducer 47 calculates a variation definition value x by using a PWM count difference (ΔCvw in this example) between the count change phase (the V-phase in this example) and the C-phase (the W-phase in this example) as the value of the expression (A−B) in the equation (10).

In this example, since ΔCuv=40, the variation definition value x is calculated on the basis of the equation (10) as follows: x=100+40=140. It is noted here that the PWM count difference ΔCvw is 130. When the V-phase PWM count is changed toward the W-phase count, the PWM count difference ΔCvw becomes 10, which is less than the threshold value α. Therefore, the common mode noise reducer 47 calculates the variation definition value x by using the PWM count difference ΔCvw between the V-phase PWM count and the W-phase PWM count as the value of the expression (A−B) in the equation (10). In this example, the variation definition value x is calculated as follows: x=100+130=230.

Next, on the basis of the calculated variation definition value x and a predetermined variation pattern illustrated in FIG. 10B (identical to the variation pattern illustrated in FIG. 6A), the common mode noise reducer 47 changes the PWM count of the count change phase that is set in step S1 for each of the PWM periods Tc within the next current control period Ta. Specifically, the common mode noise reducer 47 adds, to the PWM count of the count change phase for each of the PWM periods Tc, a variation that is determined by the variation definition value x and the variation pattern. As such, the common mode noise reducer 47 changes the PWM count of the count change phase for each of the PWM periods Tc, and then finishes the second PWM count changing process.

In this example, as illustrated in FIG. 10C, the variation (+230 or −230) determined by the variation definition value x and the variation pattern is added to the V-phase PWM count Cv for each of the PWM periods Tc. As a result, the V-phase PWM count Cv for each of the PWM periods Tc is changed. However, the total of the V-phase PWM counts Cv remains unchanged before and after the V-phase PWM counts Cv are changed. The V-phase PWM count Cv for each of the PWM periods Tc is changed in this way. Thus, as illustrated in FIG. 10C, the PWM count difference ΔCuv between the changed V-phase PWM count and the U-phase PWM count becomes greater than or equal to the threshold value α. The PWM count difference ΔCvw between the changed V-phase PWM count and the W-phase PWM count also becomes greater than or equal to the threshold value α. After finishing the second PWM count change process, the common mode noise reducer 47 proceeds to step S10.

If determining in step S5 that the count difference manner corresponds to the third manner, the common mode noise reducer 47 performs a third PWM count changing process (step S8). The third PWM count changing process is described in detail below. FIG. 11A illustrates an example where the U-phase, V-phase, and W-phase PWM counts Cu, Cv, and Cw for each of the PWM periods Tc within the current control period Ta are respectively 910, 820, and 100.

In this case, ΔCuv=90, ΔCvw=720, and ΔCuw=810. Further, out of the PWM counts of two phases (the U-phase and the V-phase) that have a PWM count difference less than the threshold value α, the U-phase PWM count Cu differs from the maximum count (1000) by less than the threshold value α. Therefore, the count difference manner corresponds to the third manner. Out of the two phases that have the PWM count difference less than the threshold value α, one phase with the greater PWM count is hereinafter sometimes referred to as an A phase, and the other phase with the smaller PWM count is hereinafter sometimes referred to as a B phase. Further, the remaining one of the three phases is hereinafter sometimes referred to as a C phase.

In this case, the PWM count difference ΔCuv between the U-phase (the A-phase) PWM count Cu and the V-phase (the B-phase) PWM count Cv is less than the threshold value α. One approach to increasing the PWM count difference ΔCuv may be to change only one of the U-phase PWM count Cu and the V-phase PWM count Cv. When only the U-phase PWM count Cu is changed, the variation definition value x is given as follows: x=100+90=190. In this case, since the U-phase PWM count Cu is 910, it is not allowed to change the U-phase PWM count Cu by using the variation definition value x of 190. On the other hand, when only the V-phase PWM count Cv is changed, the variation definition value x is given as follows: x=100+90=190. In this case, since the V-phase PWM count Cv is 820, it is not allowed to change the V-phase PWM count Cv by using the variation definition value x of 190.

Therefore, when the count difference manner corresponds to the third manner, the common mode noise reducer 47 changes both the A-phase (the U-phase in this case) PWM count and the B-phase (the V-phase in this case) PWM count. That is, when the count difference manner corresponds to the third manner, the common mode noise reducer 47 identifies, as the count change phase, each of the two phases that have the PWM count difference less than the threshold value α.

Figure 12:
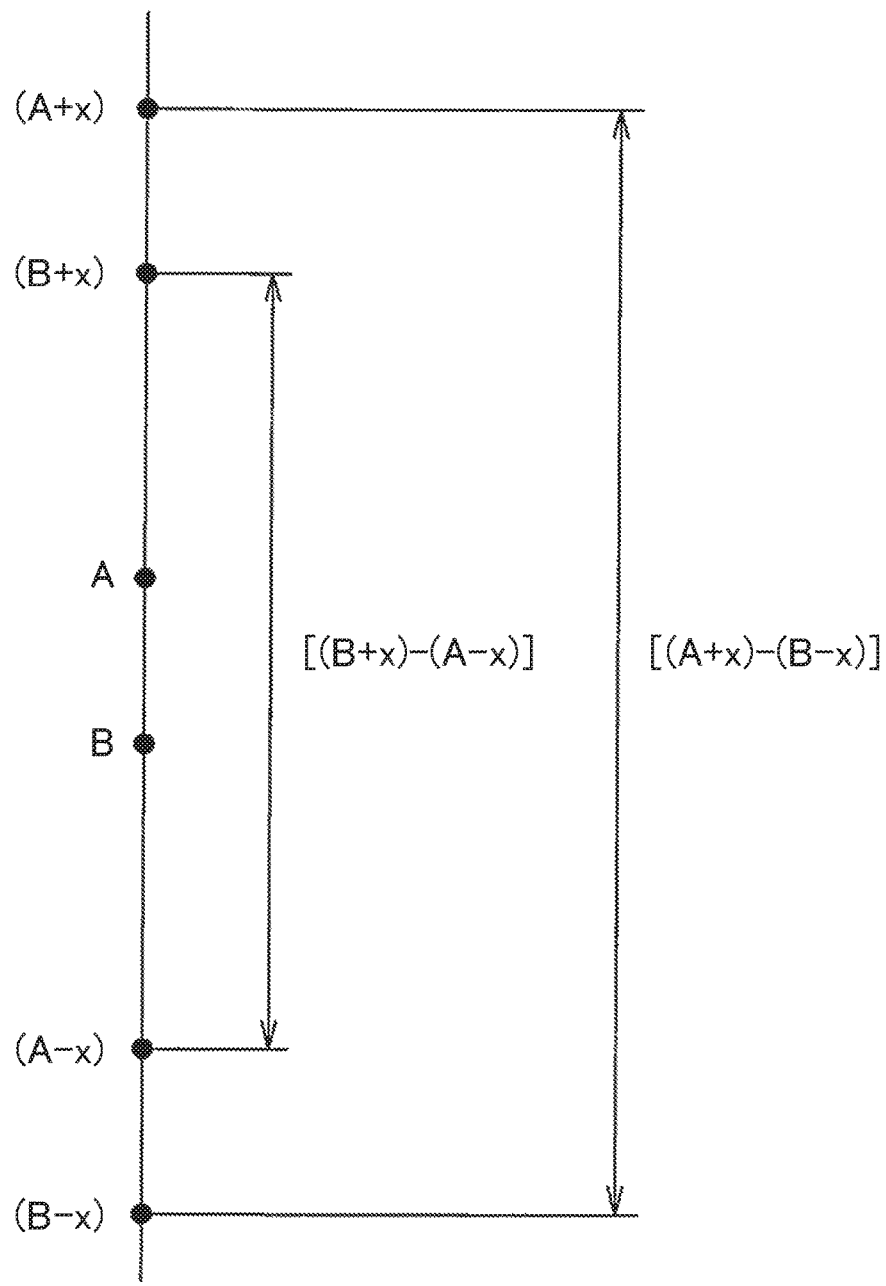
FIG. 12 is a diagram explaining a method of setting a variation definition value x.

Then, the common mode noise reducer 47 sets a variation definition value x for the count change phase (both the U-phase and the V-phase in this example). A method of setting the variation definition value x used to change the PWM counts of two phases that have a PWM count difference less than the threshold value α is described below. As illustrated in FIG. 12, out of the PWM counts of two phases that have a PWM count difference less than the threshold value α, the greater PWM count is defined herein as a PWM count A, and the smaller PWM count is defined herein as a PWM count B. The PWM count of one of the two phases is changed on the basis of the variation pattern illustrated in FIG. 6A, and the PWM count of the other of the two phases is changed on the basis of the variation pattern illustrated in FIG. 6B. The following describes how the absolute value |A−B| of the difference between the changed PWM count A and the changed PWM count B. It is assumed that the variation definition value x is greater than or equal to the threshold value α.

The value of the changed PWM count A is given by the expression (A+x) or (A−x), where x represents the variation definition value. The value of the changed PWM count B is given by the expression (B−x) or (B+x). When the value of the PWM count A is changed from A to (A+x), the value of the PWM count B is changed from B to (B−x). As a result, the difference between the changed PWM count A and the changed PWM count B is given by the expression {(A+x)−(B−x)}. On the other hand, when the value of the PWM count A is changed from A to (A−x), the value of the PWM count B is changed from B to (B+x). As a result, the difference between the changed PWM count A and the changed PWM count B is given by the expression {(B+x)−(A−x)}. Since the value of the expression {(B+x)−(A−x)} is less than the value of the expression {(A+x)−(B−x)}, the variation definition value x needs to satisfy the following equation (11).

$$\{(B+x)-(A-x)\}=\alpha \quad (11)$$

Thus, the variation definition value x is given by the following equation (12).

$$x=\{\alpha+(A-B)\}/2 \quad (12)$$

In this example, since ΔCuv=90, the variation definition value x is calculated as follows: x=(100+90)/2=95. However, since the U-phase PWM count is not allowed to become greater than 90, the common mode noise reducer 47 sets the variation definition value x for the U-phase to 90 and sets the variation definition value x for the V-phase to 100.

Next, on the basis of the calculated respective variation definition values x and predetermined respective variation patterns for the A-phase (the U-phase) and the B-phase (the V-phase) illustrated in FIG. 11B (identical to the variation patterns illustrated in FIGS. 6A and 6B), the common mode noise reducer 47 changes the A-phase PWM count and the B-phase PWM count for each of the PWM periods Tc within the next current control period Ta. Specifically, the common mode noise reducer 47 adds, to the A-phase PWM count for each of the PWM periods Tc, a variation that is determined by the variation definition value x and the variation pattern for the A-phase. As such, the common mode noise reducer 47 changes the A-phase PWM count for each of the PWM periods Tc. Further, the common mode noise reducer 47 adds, to the B-phase PWM count for each of the PWM periods Tc, a variation that is determined by the variation definition value x and the variation pattern for the B-phase. As such, the common mode noise reducer 47 changes the B-phase PWM count for each of the PWM periods Tc. Then, the common mode noise reducer 47 finishes the third PWM count changing process.

In this example, as illustrated in FIG. 11C, the variation (+90 or −90) determined by the variation definition value x and the variation pattern for the U-phase is added to the U-phase PWM count Cu for each of the PWM periods Tc. As a result, the U-phase PWM count Cu for each of the PWM periods Tc is changed. On the other hand, the variation (+100 or −100) determined by the variation definition value x and the variation pattern for the V-phase is added to the V-phase PWM count Cv for each of the PWM periods Tc. As a result, the V-phase PWM count Cv for each of the PWM periods Tc is changed. However, the total of the U-phase PWM counts Cu remains unchanged before and after the U-phase PWM counts Cu are changed. The total of the V-phase PWM counts Cv also remains unchanged before and after the V-phase PWM counts Cv are changed. The U-phase PWM count Cu and the V-phase PWM count Cv for each of the PWM periods Tc are changed in this way. Thus, as illustrated in FIG. 11C, the PWM count difference ΔCuv between the changed U-phase PWM count Cu and the changed V-phase PWM count Cv becomes greater than or equal to the threshold value α.

After finishing the third PWM count change process, the common mode noise reducer 47 proceeds to step S10. If determining in step S5 that the count difference manner is the fourth manner, the common mode noise reducer 47 performs a fourth PWM count changing process (step S9). The fourth PWM count changing process is described in detail below.

FIG. 13A illustrates an example where the U-phase, V-phase, and W-phase PWM counts Cu, Cv, and Cw for each of the PWM periods Tc within the current control period Ta are respectively 530, 490, and 470. In this case, since ΔCuv=40, ΔCvw=20, and ΔCuw=60, the count difference manner corresponds to the fourth manner. In this case, the common mode noise reducer 47 identifies, as a first phase to which a greater variation definition value is likely to be applied, one of the three phases that has the second greatest PWM count. Further, out of the other two phases, the common mode noise reducer 47 identifies one with the greater PWM count as a second phase and identifies the other with the smaller PWM count as a third phase. In this example, the V-phase is identified as the first phase, the U-phase is identified as the second phase, and the W-phase is identified as the third phase.

Next, the common mode noise reducer 47 sets a variation definition value $x_{23}$ for each of the second phase PWM count and the third phase PWM count on the basis of the equation (12). In this case, in the equation (12), "A" represents the value of the second phase (the U-phase) PWM count, and "B" represents the value of the third phase (the W-phase) PWM count. In this example, the variation definition value $x_{23}$ for each of the second phase (the U-phase) PWM count and the third phase (the W-phase) PWM count is calculated as follows: $x_{23}=\{100+(530-470)\}/2=80$.

Then, the common mode noise reducer 47 sets a variation definition value $x_1$ for the first phase PWM count on the basis of the following equation (13).

$$x_1 = \alpha + \beta x_{23} \qquad (13)$$

In the equation (13), β represents the greater one of the PWM count difference between the first phase and the second phase and the PWM count difference between the first phase and the third phase.

In this example, since β=40, and $x_{23}$=80, the variation definition value $x_1$ is calculated as follows: $x_1$=100+40+80=220. Next, on the basis of the respective variation definition values $x_1$ and $x_{23}$ and the respective variation patterns illustrated in FIG. 13B for the first phase, the second phase, and the third phase, the common mode noise reducer 47 changes the first phase PWM count, the second phase PWM count, and the third phase PWM count for each of the PWM periods Tc within the next current control period Ta. Specifically, the common mode noise reducer 47 adds, to the first phase (the V-phase) PWM count for each of the PWM periods Tc, a variation that is determined by the variation definition value $x_1$ and the variation pattern for the first phase. As such, the common mode noise reducer 47 changes the first phase PWM count for each of the PWM periods Tc. Likewise, the common mode noise reducer 47 adds, to the second phase (the U-phase) PWM count for each of the PWM periods Tc, a variation that is determined by the variation definition value $x_{23}$ and the variation pattern for the second phase. As such, the common mode noise reducer 47 changes the second phase PWM count for each of the PWM periods Tc. Likewise, the common mode noise reducer 47 adds, to the third phase (the W-phase) PWM count for each of the PWM periods Tc, a variation that is determined by the variation definition value $x_{23}$ and the variation pattern for the third phase. As such, the common mode noise reducer 47 changes the third phase PWM count for each of the PWM periods Tc. Then, the common mode noise reducer 47 finishes the fourth PWM count changing process.

In this example, as illustrated in FIG. 13C, the variation (+80 or −80) determined by the variation definition value $x_{23}$ and the variation pattern illustrated in FIG. 6A is added to the U-phase (the second phase) PWM count Cu for each of the PWM periods Tc. This changes the U-phase PWM count Cu for each of the PWM periods Tc. Likewise, the variation (+220 or −220) determined by the variation definition value $x_1$ and the variation pattern illustrated in FIG. 6A is added to the V-phase (the first phase) PWM count Cv for each of the PWM periods Tc. This changes the V-phase PWM count Cv for each of the PWM periods Tc. Likewise, the variation (+80 or −80) determined by the variation definition value $x_{23}$ and the variation pattern illustrated in FIG. 6B is added to the W-phase (the third phase) PWM count Cw for each of the PWM periods Tc. This changes the W-phase PWM count Cw for each of the PWM periods Tc.

As such, the U-phase PWM count Cu, the V-phase PWM count Cv, and the W-phase PWM count Cw for each of the PWM periods Tc are changed. Thus, as illustrated in FIG. 13C, all the PWM count differences ΔCuv, ΔCvw, and ΔCuw between the respective changed PWM counts for each of the PWM periods Tc become greater than or equal to the threshold value α. After finishing the fourth PWM count change process, the common mode noise reducer 47 proceeds to step S10.

In step S10, the U-phase, V-phase, and W-phase PWM counts Cu, Cv, and Cw for each of the PWM periods Tc that have been subjected to the PWM count change process through step S6, S7, S8, or S9 are supplied to the PWM outputter 48 as U-phase, V-phase, and W-phase PWM counts Cu, Cv, and Cw for each of the PWM periods Tc within the next current control period Ta. After that, the common mode noise reducer 47 finishes processing in the present current control period Ta.

In summary, according to the embodiment, when, out of all possible combinations of any two of the three phases, at least one of the combinations has a difference in PWM count less than a threshold value, the PWM count of at least one of the two phases of the at least one of the combinations for each of the PWM period Tc within the current control period Ta is changed, without changing the total of the PWM counts of the at least one of the two phases within the current control period Ta, such that each of the combinations has a difference in PWM count greater than or equal to the threshold value. This reduces the likelihood of switching elements of multiple phases being switched simultaneously, thus reducing a common-mode noise that is caused by switching of the switching elements.

The embodiment may be modified in various ways within the scope of the claims. For example, although the embodiment illustrates that a motor control unit according to the invention is used in electric power steering systems, the motor control unit may be used in apparatuses or systems other than electric power steering systems.

What is claimed is:

1. A motor control unit for controlling a three-phase electric motor on a basis of PWM signals that are generated for each of a plurality of PWM periods included in a current control period, the motor control unit comprising:
   a PWM count generator that generates PWM counts of three phases for each current control period;
   a PWM count setter that sets the PWM counts of the three phases generated for a specific current control period by the PWM count generator, as PWM counts of the respective phases for each of the plurality of PWM periods within the specific current control period;
   a PWM count changer that when, out of all possible combinations of any two of the three phases, at least one of the combinations has a difference in PWM count less than a threshold value, changes the PWM count of at least one of the two phases of the at least one of the combinations for each of the plurality of PWM periods within the specific current control period, without changing a total of the PWM counts of the at least one of the two phases within the specific current control period, such that each of the combinations has a difference in PWM count greater than or equal to the threshold value; and
   a PWM signal generator that generates the PWM signals for the respective phases for each of the plurality of PWM periods, on the basis of the PWM counts that are set for the respective phases for each of the plurality of PWM periods within the specific current control period and that are changed by the PWM count changer.

2. The motor control unit according to claim 1, wherein
   the PWM count changer changes one of the two phases that have the difference in PWM count less than the threshold value, without changing the total of the PWM counts of the one of the two phases within the specific current control period, such that each of the combinations has the difference in PWM count greater than or equal to the threshold value.

3. The motor control unit according to claim 1, wherein
   the PWM count changer changes both the two phases that have the difference in PWM count less than the threshold value, without changing the total of the PWM counts of each of the two phases within the specific current control period, such that each of the combinations has the difference in PWM count greater than or equal to the threshold value.

* * * * *